United States Patent [19]

Farrar

[11] 4,004,070
[45] Jan. 18, 1977

[54] VISCOSITY REDUCTION OF ORGANOPOLYLITHIUM-INITIATED POLYMER SOLUTIONS

[75] Inventor: Ralph C. Farrar, Bartlesville, Okla.

[73] Assignee: Phillips Petroleum Company, Bartlesville, Okla.

[22] Filed: Mar. 27, 1972

[21] Appl. No.: 238,538

Related U.S. Application Data

[63] Continuation of Ser. No. 76,209, Sept. 28, 1970, abandoned.

[52] U.S. Cl. .............................. 526/86; 526/175; 526/335; 526/340
[51] Int. Cl.² ........................................ C08F 36/06
[58] Field of Search ............... 260/94.2 T, 94.7 R, 260/94.7 A, 94.7 N, 94.,7 HA; 526/86

[56] References Cited

UNITED STATES PATENTS

| | | | |
|---|---|---|---|
| 3,177,190 | 4/1965 | Hsilh | 260/880 B |
| 3,280,084 | 10/1966 | Zelinski | 260/83.7 |
| 3,281,383 | 10/1966 | Zelinski | 260/94.7 HA |
| 3,383,377 | 5/1968 | Uranuk | 260/94.7 HA |
| 3,468,972 | 9/1969 | Hsilh | 260/94.7 A |
| 3,506,639 | 4/1970 | Halasa | 260/94.7 HA |

Primary Examiner—Paul R. Michl

[57] ABSTRACT

The viscosity of organopolylithium-initiated polymer solutions is reduced by introducing into the polymerization reaction after the polymerization reaction is at least 80 percent complete, an organomonolithium compound.

1 Claim, No Drawings

VISCOSITY REDUCTION OF ORGANOPOLYLITHIUM-INITIATED POLYMER SOLUTIONS

This is a continuation of application Ser. No. 76,209, filed Sept. 28, 1970, now abandoned.

This invention relates to polymer solutions.

In one of its more specific aspects, this invention relates to the reduction of organopolylithium-initiated polymer solution viscosities.

It is conventional practice to polymerize conjugated dienes or vinyl compounds employing organopolylithium compounds as initiators. For example, butadiene can be polymerized employing 1,4-dilithiobutane as the initiator. However, the viscous nature of the products makes difficult the uniform dispersion of materials subsequently added to them, as for example, in a subsequent coupling reaction.

The problem of high solution viscosity has been handled in numerous ways, none of which have proved satisfactory. For example, viscosity-reducing liquids, such as tetrahydrofuran, have been added to the system prior to the introduction of the coupling agent. However, such liquids are difficult to separate from other diluents introduced during the polymerization reaction. Furthermore, even when separation can be substantially affected, there remains in the diluents sufficient quantities of the added liquids to alter the nature of the polymer subsequently produced with that diluent.

The method of the present invention solves this problem by reducing the viscosity of organopolylithium-initiated polymer solutions by introducing into the polymerization reaction mixture after the polymerization reaction is at least 80 percent complete, an organomonolithium compound, this introduction being made prior to coupling. As a result, the viscosity of the polymer solution is decreased and gel formation in the recovered coupled polymer is suppressed. The organomonolithium compounds are subsequently destroyed during polymer recovery and, as a result, their introduction into the polymer solution does not produce undesirable effects in subsequent processing employing the recycled diluent.

Accordingly, it is an object of this invention to provide an improved polymerization process.

It is another object of this invention to minimize polymerization process operational costs.

These and other objects of this invention will be evident from the following discussion.

The present invention is applicable to conventional polymerization processes for preparing conjugated diene polymers and to those polymerization processes in which conjugated dienes are copolymerized with other monovinyl-containing monomers. In these processes, the monomer to be polymerized is contacted with a polyfunctional organoalkali metal compound preferably an organolithium compound in the presence of a hydrocarbon diluent. These polyfunctional organoalkali metal compounds preferably contain 2 to 4 alkali metal carbon atoms per molecule and are well known in the art. One such group is prepared by reacting divinylbenzene with an organomonolithium in an amount from about 0.025 mole to about 1.5 moles of divinylbenzene per mole of organomonolithium. The organopolylithium compound thus prepared is employed as an initiator in an amount in the range of from about 0.5 to about 5 milliequivalents of lithium per 100 parts of monomer.

The organomonolithium compound which is introduced into the polymerization reaction mixture according to the present invention to reduce the viscosity of the reaction mixture is introduced prior to, or simultaneously with, the introduction of the coupling agent. Such coupling agents are conventional in the art and include silicon tetrachloride and tin tetrachloride.

The polymerization reaction is conducted under conventional conditions, that is, it is conducted in the presence of a hydrocarbon diluent containing from about 4 to about 10 carbon atoms per molecule, at a temperature of from about −100° C. to about 150° C. and for a period of up to about 100 hours.

The organomonolithium compound which is employed in the method of this invention can be any hydrocarbyllithium compound having in the range of 1 to about 25 carbon atoms per molecule. It will be introduced into the reaction mixture, in any suitable method, in an amount from about 0.05 to about 5 moles of organomonolithium per equivalent of lithium in the organopolylithium initiator added. Preferably, the organomonolithium will be n-butyllithium. Other suitable organomonolithium compounds include methyllithium, cyclohexyllithium, pentaeicosyllithium, phenyllithium, sec-butyllithium, cyclopentyllithium, and the like.

The method of this invention can also be carried out while employing other conventional procedures of the known polymerization processes. For example, the polymerization process can employ such materials as randomizing agents for the preparation of copolymers. It is preferable to increase the amount of coupling agent added during coupling to provide some amount of coupling agent to react at least with a portion of that lithium contained in the organomonolithium.

The method and operability of the present invention is illustrated by the following example which represents the best mode for carrying out the process of this invention.

However, the invention is not to be considered as limited to the specific embodiments thereof.

EXAMPLE

Into a nitrogen-purged reactor were charged, in order, 760 parts (by weight) cyclohexane, 75 parts butadiene and 25 parts styrene and 2.20 milliequivalents (based on lithium) of a polylithium initiator.

This polylithium initiator was prepared by subjecting an admixture comprising 69 ml cyclohexane, 3.12 mmole divinylbenzene, 3.2 ml of butadiene and 12.50 mmole of n-butyllithium to a temperature of 158° F. for 40 minutes.

The polymerization reactor was maintained at 158° F. for 60 minutes. The contents of the reactor were drained and the time required for drainage was measured as indicative of the viscosity of the mixture.

To the reactor containing the polymerization reaction mixture was added silicon tetrachloride, 0.25 mole for each equivalent of lithium added (less an estimated amount lost to impurities), including both that of the initiator and of the organomonolithium (if added). The reaction mixture was then coupled by maintaining the mixture at 158° F. for 30 minutes. Thereafter the reactor was drained, if possible, and the time required for drainage was measured as indicative of the viscosity of the mixture after coupling.

One run was carried out in which no organomonolithium was added prior to addition of the silicon tetrachloride and four runs were made in which various quantities of the organomonolithium, and accordingly of silicon tetrachloride, were added, respectively. Results were as follows:

| Run No. | n-Butyllithium Added, mmoles | Moles n-Butyllithium per Equivalent of Li in Initiator Charged | Silicon Tetrachloride Added, mmoles | Drain Time, Sec. | |
|---|---|---|---|---|---|
| | | | | After n-Butyllithium Addition | After Coupling |
| 1 | 0 | 0 | 0.45 | 3.0 | Gel |
| 2 | 0.9 | 0.41 | 0.68 | 1.9 | Gel |
| 3 | 1.8 | 0.82 | 0.90 | 1.5 | 2.0 |
| 4 | 2.7 | 1.23 | 1.12 | 1.0 | 1.2 |
| 5 | 3.6 | 1.64 | 1.35 | 0.9 | 1.0 |

In all instances conversion of the monomer to polymer was substantially complete.

The above data illustrate the reduction in solution viscosity which is effected by the addition of organomonolithium compounds when added to the organopolylithium-initiated polymerization subsequent to substantially complete polymerization but prior to coupling.

It will be evident from the foregoing that various modifications are possible to the method of this invention. Such, however, are considered as being within the skill of the art.

What is claimed is:
1. A method for producing polymers by the homopolymerization of butadiene or the copolymerization of butadiene and styrene which comprises:
 a. homopolymerizing said butadiene or copolymerizing said butadiene and said styrene with an initiator comprising an organo-polylithium compound to form a first mixture comprising polymers.
 b. introducing an organo-monolithium compound into said first mixture after the polymerization is at least 80 percent complete to form a second mixture comprising polymers;
 c. then introducing silicon tetrachloride coupling agent into said second mixture to couple said polymer; and,
 d. recovering said polymers.

* * * * *